(12) United States Patent
Stewart et al.

(10) Patent No.: US 7,552,440 B1
(45) Date of Patent: Jun. 23, 2009

(54) PROCESS COMMUNICATION MULTIPLEXER

(75) Inventors: Bryan P. Stewart, Jefferson, WI (US); Craig C. Bartman, Waukesha, WI (US); Daniel F. Liesing, Waukesha, WI (US); Steven M. Cisler, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/407,473

(22) Filed: Sep. 28, 1999

(51) Int. Cl.
*G06F 9/44* (2006.01)

(52) U.S. Cl. .................................. 719/312; 709/213

(58) Field of Classification Search ................ 709/310, 709/311, 312, 246, 212, 213; 719/310–316; 711/147, 148, 153, 173, 200, 202, 205, 206, 711/207
See application file for complete search history.

(56) References Cited

U.S. PATENT DOCUMENTS

| | | | | |
|---|---|---|---|---|
| 4,153,934 A * | 5/1979 | Sato | ........................... | 718/103 |
| 5,230,051 A * | 7/1993 | Quan | ........................... | 709/312 |
| 5,303,343 A * | 4/1994 | Ohya et al. | ........................... | 709/246 |
| 5,333,269 A * | 7/1994 | Calvignac et al. | ........................... | 709/215 |
| 5,437,031 A * | 7/1995 | Kitami | ........................... | 709/312 |
| 5,513,328 A * | 4/1996 | Christofferson | ........................... | 709/244 |
| 5,548,728 A * | 8/1996 | Danknick | ........................... | 709/213 |
| 5,561,784 A | 10/1996 | Chen et al. | ........................... | 395/484 |
| 5,692,193 A | 11/1997 | Jagannathan et al. | ........................... | 395/676 |
| 5,867,649 A | 2/1999 | Larson | ........................... | 395/200.31 |
| 5,870,588 A | 2/1999 | Rompaey et al. | ........................... | 395/500 |
| 5,991,820 A * | 11/1999 | Dean | ........................... | 709/312 |
| 6,052,738 A * | 4/2000 | Muller et al. | ........................... | 709/250 |
| 6,092,155 A * | 7/2000 | Olnowich | ........................... | 711/142 |
| 6,122,659 A * | 9/2000 | Olnowich | ........................... | 709/213 |
| 6,449,699 B2 * | 9/2002 | Franke et al. | ........................... | 711/147 |
| 6,684,259 B1 * | 1/2004 | Discavage et al. | ........................... | 719/316 |
| 6,920,485 B2 * | 7/2005 | Russell | ........................... | 709/214 |

\* cited by examiner

*Primary Examiner*—Van H Nguyen
(74) *Attorney, Agent, or Firm*—Turocy & Watson LLP; Alexander R. Kuszewski (57) ABSTRACT

A system and method is provided that facilitates communication between different processes and different threads in these different processes. The system includes a process communication multiplexer (PCM) that creates a well-known named shared memory area that can be used by any processes/threads running in the operating system for building messages that can be sent to any other threads, utilizing services provided by the PCM. The well known named shared memory area will contain all the information necessary for a process to build mechanisms, such as a unique semaphore and named events, for sending data to the PCM for distribution to other processes. The PCM will also support communications directed to it by remote processes.

41 Claims, 11 Drawing Sheets

Fig. 6c

PROCESS COMMUNICATION MULTIPLEXER

TECHNICAL FIELD

The present invention generally relates to computer processes, and in particular to a system and method for communicating data blocks of varying sizes between different processes running on a computer system.

BACKGROUND OF THE INVENTION

Most computer operating systems today are multi-process systems in which several processes are running simultaneously. A process is a running program that owns its own memory, file handles, and other system resources. An individual process can contain separate execution paths, called threads. For the most part, all of a process's code and data space is available to all of the threads in the process. Threads are managed by the operating system, and each thread has its own stack. A main thread or primary thread (e.g. such as an application program) communicates with subsidiary threads in many different ways, such as by setting a global variable.

Computer operating systems such as Microsoft Windows CE, do not provide a sufficient mechanism whereby variable amounts of data can be easily transported between different processes. Microsoft Windows CE employs a set method of copying data from process to process. The main or primary thread handles all of the communication from the windows processing signals and communication from the other processes. In some situations, multiple processes desire to receive data from subsidiary threads. Furthermore, subsidiary threads in one process may desire to receive data from a subsidiary thread in another process. This type of operating system does not allow for thread to thread communication. In fact, Microsoft Windows CE and other similar operating systems allow limited pointer passing between processes, and can not support direct passing of variable amounts of data between processes and between threads.

Another drawback of a system such as Microsoft Windows CE, is that it does not allow for communication between local and remote processes, such as a process running on a different machine. The system also does not allow for communicating data from one process to another process in various types of formats and protocols.

SUMMARY OF THE INVENTION

The present invention provides for a system and method implemented into a computer operating system that facilitates communication between different processes and different threads in these different processes. The system includes a process communication multiplexer (PCM) that creates a well-known named shared memory area that may be employed by numerous processes/threads running in the operating system for building messages that may be sent to other threads, utilizing services provided by the PCM. The well known named shared memory area will contain information necessary for a process to build mechanisms (such as a unique semaphore and named events) for sending data to the PCM for distribution to other processes. The PCM also supports communications directed thereto by remote processes.

A local process that desires to receive data from an external process creates a named shared memory area. The named shared memory area is propagated with information required by the PCM to build mechanisms (such as a unique semaphore and named events) for receiving data from the PCM. The other process or thread will then "check in" with the PCM by using the PCM's well known named shared memory area and the mechanisms to inform the PCM that data is being sent. This allows the PCM to "link" with the local process's shared memory area. This linking lets the PCM know a process identifier and routing information (it's shared memory area) for this local process. A remote process that desires to send and/or receive data will employ the configured remote communications path in order to communicate with the PCM. When a remote process link links with the PCM, it provides a process identifier as well as routing information required for the particular remote communications.

Local processes send all messages through the PCM's well known named shared memory area and the PCM sends messages to a local process by using that local process's named shared memory area. Remote process messages are sent and received through the remote communications path. The PCM is responsible for receiving any message sent by a source process and delivering that message to a destination process. The PCM routes the message to the correct destination process. The sequence employed to send and receive data is synchronized in a manner that both sending and receiving processes are aware the transfer of data has been completed, as well as when to write to or read from the named shared memory area, with the events, the unique semaphore, and the named shared memory area being the unique connection between the two processes.

One particular aspect of the invention relates to a system that provides a communication medium between a plurality of processes running in a computer system. The system includes a shared memory component adapted to receive a block of data from a sending process, and a process communication multiplexer component adapted to respond to a communication to the shared memory component from the sending process and further adapted to route the block of data to a receiving process.

Another aspect of the present invention relates to a method for communicating blocks of data from one process running in a computer system to another process running in a computer system. The method includes the steps of writing a block of data to a shared memory component from a sending process, parsing the block of data to determine a receiving process to route the block of data and an interface protocol required by the receiving process, converting the block of data to the proper protocol for the receiving process, and routing the block of data to the receiving process.

Yet another aspect of the present invention relates to a computer program embodied on a computer readable medium for allowing processes running in a computer system environment to communicate blocks of data of varying sizes to other processes. The computer program includes a shared memory object adapted to receive a block of data from a plurality of sending processes one at a time, and a process communication multiplexer object adapted to respond to receipt of the block of data to the shared memory object from one of the plurality of sending processes and further adapted to route the block of data to one of a plurality of receiving processes.

Still yet another aspect of the present invention relates to a system that provides a communication medium between a plurality of processes running in a computer environment. The system includes a shared memory component adapted to receive a block of data from a sending process. The system also includes a process communication multiplexer component adapted to respond to a communication to the shared memory component from the sending process, adapted to convert the block of data to the proper protocol for sending to a receiving process and adapted to route the block of data to a named shared memory component corresponding to the receiving process based on routing information located within the block of data. Each of the plurality of processes must check in with the process communication multiplexer prior to any communication between processes to provide the process communication multiplexer with identifier information for use in converting the block of data to the proper protocol and transferring the block of data to the receiving process.

Another aspect of the present invention relates to a system that provides a communication medium between a plurality of processes running in a computer environment. The system includes means for receiving a block of data from a sending process, means for responding to a communication to the means for receiving the block of data from the sending process, means for converting the block of data to the proper protocol for sending to a receiving process, and means for routing the converted block of data to the receiving process.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention will now be described with reference to the drawings. The present invention will be described with reference to a system that provides a communication medium between alternate processes running on a computer system. The following detailed description is of the best modes presently contemplated by the inventors for practicing the invention. It should be understood that the description of these preferred embodiments are merely illustrative and that they should not be taken in a limiting sense.

Figure 1A:
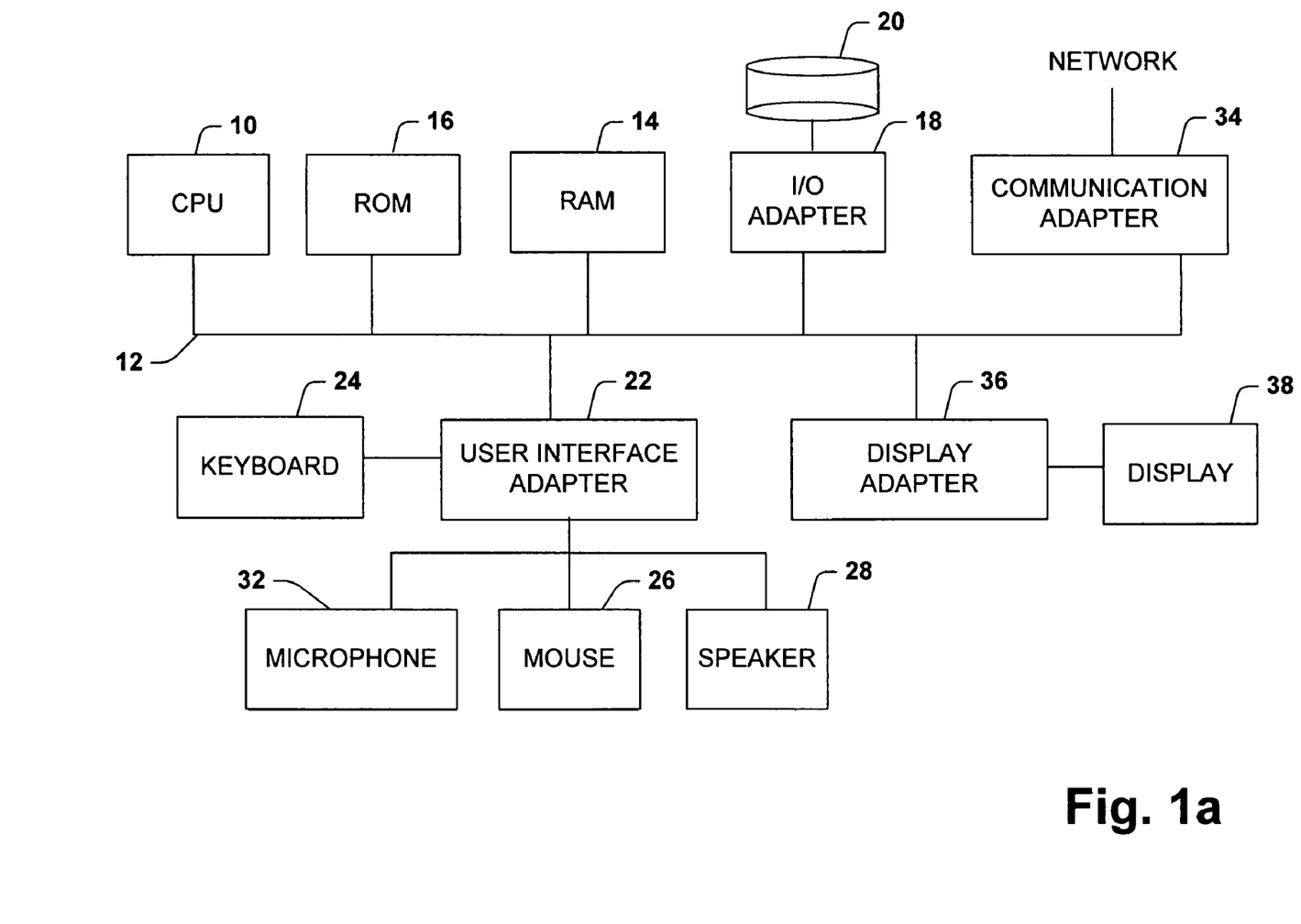
FIG. 1a is a block schematic diagram of a computer system in accordance with the present invention.

A preferred embodiment of a system in accordance with the present invention is preferably practiced in the context of a personal computer (PC) such as an IBM, Apple Macintosh or UNIX based computer. A representative hardware environment is depicted in FIG. 1a, which illustrates a typical hardware configuration of a workstation or PC in accordance with a preferred embodiment having a central processing unit 10, such as a microprocessor, and a number of other units interconnected via a system bus 12. The workstation shown in FIG. 1a includes a Random Access Memory (RAM) 14, Read Only Memory (ROM) 16 an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g. a data processing network) and a display adapter 36 for connecting the bus 12 to a display device 38. The workstation typically has resident thereon an operating system such as Microsoft Windows Operating System (OS), the IBM OS/2 operating system, the MAC OS, or UNIX operating system. Preferably, the operating system is a Microsoft Windows CE operating system.

Figure 1B:
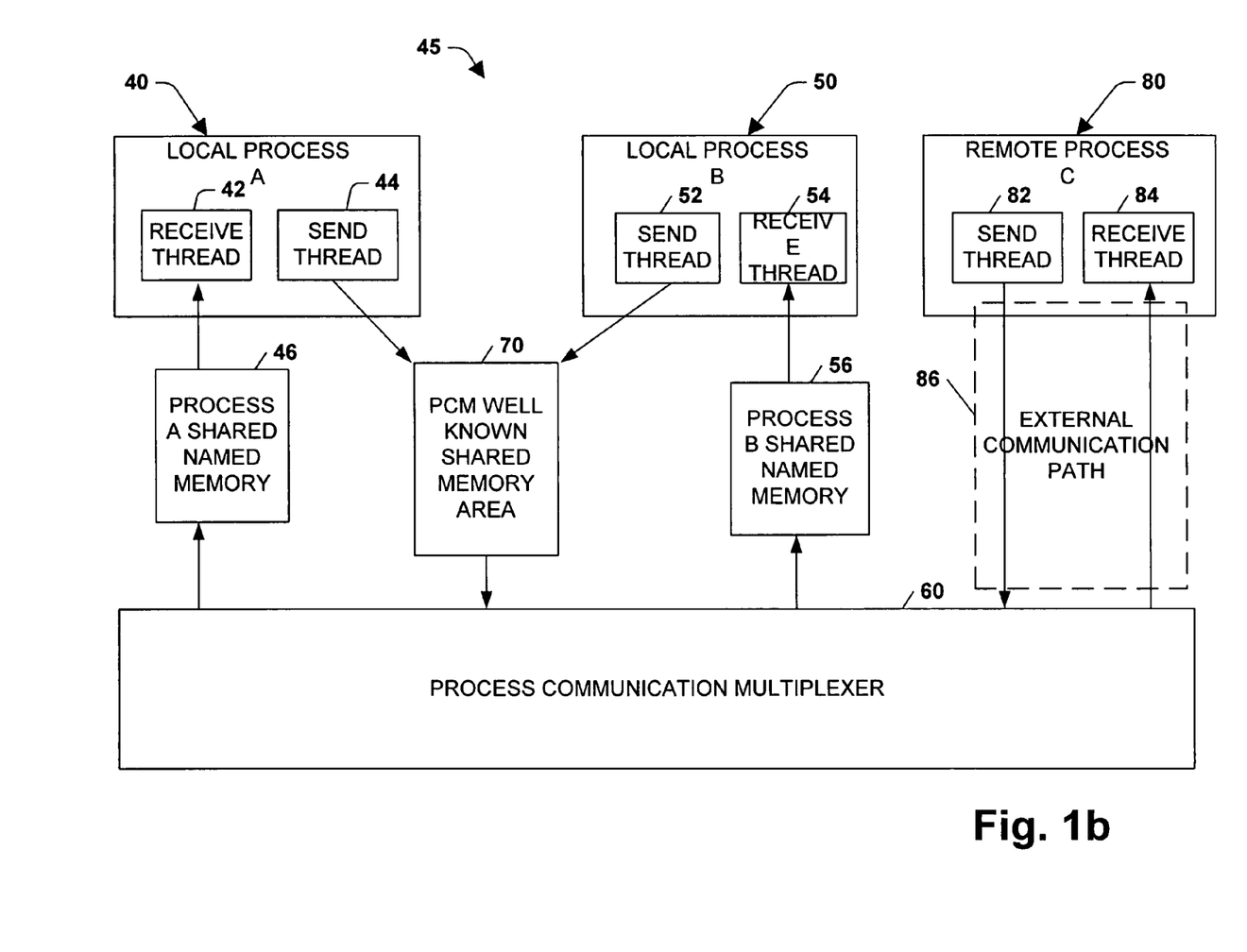
FIG. 1b is a block schematic diagram of interprocess communication data flow in accordance with the present invention.

Referring to FIG. 1b illustrating a schematic block diagram of a system 45 provided with a Process Communication Multiplexer component (PCM) 60 and a plurality of process components running simultaneously with one another. The system 45 is preferably running Microsoft Windows CE on a personal computer (not shown) or workstation, the personal computer is typically running a single processor system. The CPU 10 (FIG. 1a) is programmed to control and operate the various components within the computer system 45 in order to carry out the various functions described herein. The processor or CPU 10 can be any of a plurality of processors, such as the ARM, p24T, Pentium 50/75, Pentium 60/90, and Pentium 66/100, Pentium PRO and Pentium 2, and other similar and compatible processors. The manner in which the processor 10 can be programmed to carry out the functions relating to the present invention will be readily apparent to those having ordinary skill in the art based on the description provided herein. Furthermore, the manner in programming the CPU 10 to operate the invention according to the description herein will be apparent to those skilled in the art of computer programming.

In the particular example illustrated in FIG. 1b, the system 45 is running a local process 40 labeled as local process A, and a local process 50 labeled as local process B. The local process 40 includes at least one receive thread 42 and at least one send thread 44. A thread is a task that is running inside the local process and each thread can send and receive data between other threads in other processes according to the present invention. The local process 50 includes a send thread 52 and a receive thread 54. The PCM 60 allows local process 40 to communicate to local process 50 regardless of the size of the data block being sent between the processes. The PCM 60 also allows for threads in one process to have the ability to communicate to threads in other processes. This is accomplished by providing a PCM well known shared memory area component 70 that both the send thread 44 of local process 40, and the send thread 52 of local process 50 can write data to which the PCM 60 can read, interpret and route to another local process. The shared memory 70 may be used by other processes/threads to build messages that can be sent to another registered process/thread utilizing services provided by the PCM 60.

The well known named shared memory area 70 contains information needed for a process to build mechanisms, such as a unique semaphore and named events, for sending data to the PCM 60 for distribution. Semaphores are typically memory locations that contain information relating to the status for shared resources. In the most common case, a separate semaphore is assigned to each shared resource. When a device desires access to a shared resource, it first accesses the semaphore that corresponds to the shared resource to determine if the shared resource is available. If the semaphore indicates that the shared resource is available, the requesting device changes the semaphore to indicate that the shared resource is now busy, and then accesses the shared resource. When the device has completed its interaction with the shared resources, it writes data to the semaphore to indicate that the shared resource is now available for other devices to use.

Each local process sets up a local process shared named memory for receiving data from other processes via the PCM 60. In the present example, the local process 40 includes a process A shared named memory component 46, and the local process 50 includes a process B shared named memory component 56. The PCM 60 also listens for communications to it by a remote process component 80 labeled as remote process C. The remote process 80 includes a send thread 82 and a receive thread 84 and communicates with the PCM 60 via a communication path 86. The external communication path 86 maybe TCP/IP, direct serial or any other method of connecting two computers together, for example, suitable for carrying out the present invention. According to a preferred aspect of the present invention, the communication path could be a network backbone. The network backbone may be a hardwired data communication path made of twisted pair cable, shielded coaxial cable or fiber optic cable, for example, or may be wireless or partially wireless in nature. Information is transmitted via the network backbone between the remote process 80 and the PCM 60 which is coupled to the network backbone through a port in the computer. The communication path preferably adheres to the RS232C standard for communicating command and parameter information. However, any communication path suitable for carrying out the present invention may be employed.

The PCM 60 will not hold routing information for the processes that it will ultimately multiplex, as this information will be received during external process linking. If the remote process 80 desires to send and/or receive data it will use the configured external communications path 86 in order to communicate with the PCM 60. The remote process 80 will need to provide the PCM 60 with a process identifier as well any routing information when it links with the PCM 60. In general, local processes send all messages through the PCM well known shared memory 70, and the PCM sends messages to the local processes by using the local processes shared named memory area. Remote process messages are sent and received through the external communications path.

In a preferred aspect of the present invention, a predetermined structure is used for any named shared memory 46 and 56, and the well-known shared memory area 70 for interprocess communication. The structure will contain information necessary for the sending process to create the appropriate mechanisms and communicate with the desired destination process. Each memory is preferably configured with a structure that contains the following: shared memory size, unique semaphore identifier, unique read event identifier, unique read done event identifier, interface identifier, interface version, data size (the data size could include a single or multiple message), return status and a data buffer.

The shared memory size is the array size of the data buffer in bytes. This is where the block of data will be stored. The unique semaphore identifier is used to create the unique semaphore that will grant the sending process permission to employ this named shared memory area for data transfer. The sending process must release the unique semaphore after the read done event has been received. The read event identifier is set by the sending process when message(s) are ready to be read by the receiving process. It's always set after the message(s) have been written into the named shared memory area. The read done event identifier is set when the message(s) have been read and processed by the receiving process. The interface identifier will specify which protocol is being used in order to correctly understand and parse the message(s) in the data buffer. This allows some flexibility in the types of messages that may be exchanged. The interface version will specify the version of the above interface identifier. The data size is the length, in bytes, of all the message(s) in the data buffer. The return status is used by the receiving process to inform the sending process what the status was of the message just sent. It can be read after the read done even has been received. The data buffer holds the data, which could include one or more messages.

The present invention may be implemented via object oriented programming techniques. In this case each component of the system, could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the PCM and the shared memory components could be implemented utilizing hardware and/or software, and all such variations are intended to fall within the appended claims included herein.

Figure 2:
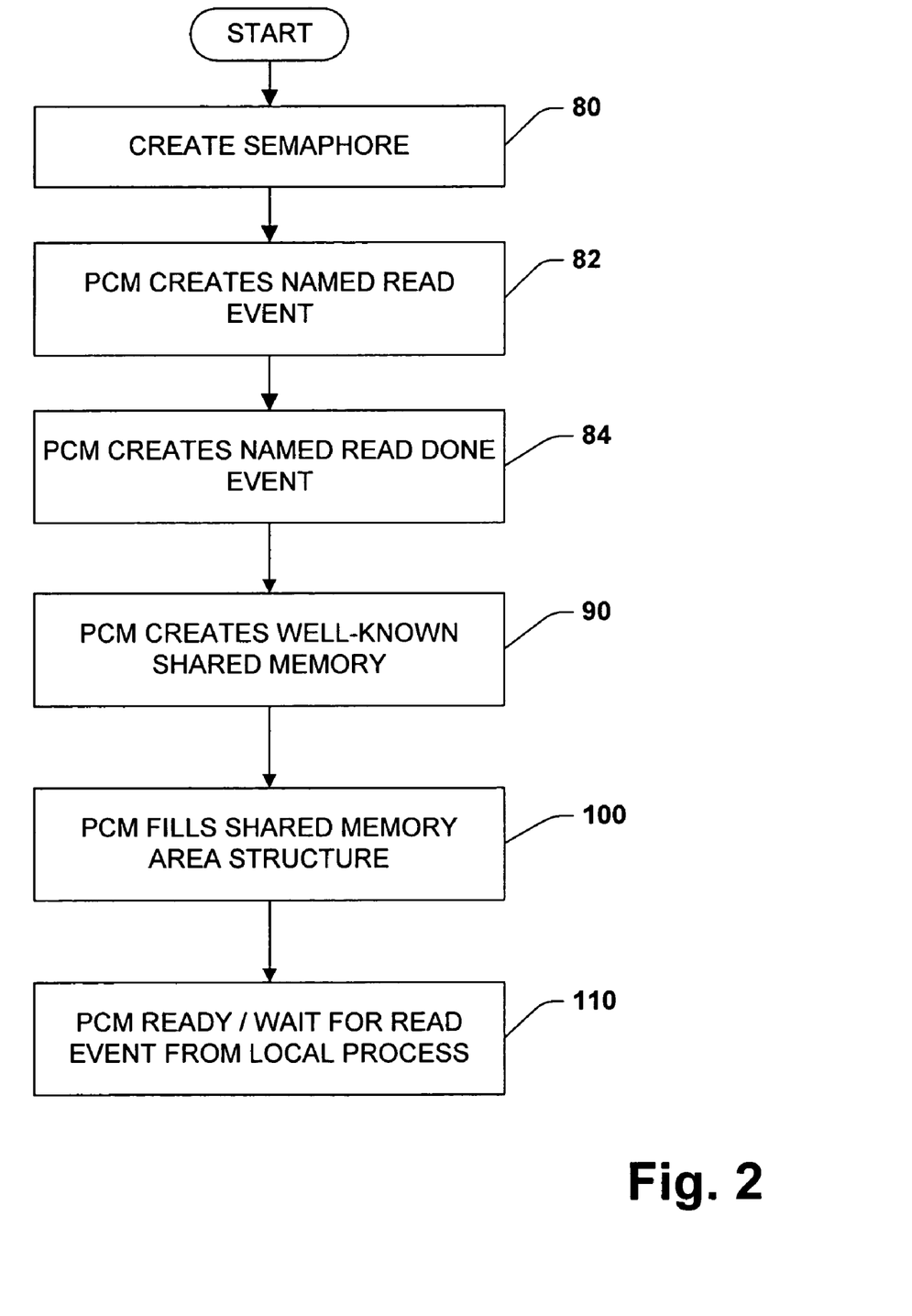
FIG. 2 is a flow diagram of a process communication multiplexer startup procedure in accordance with the present invention.

FIG. 2 is a flow diagram illustrating one particular methodology for performing an initial setup procedure for the PCM 60 according to the present invention. In step 80, a a semaphore is created. In step 82, the PCM 60 creates a named read event. In step 84, the PCM 60 creates a named read done event. In step 90, the PCM 60 creates the well-known shared memory 70. Preferably, the shared memory area 70 is setup in the form of the structure as previously described. A create routine as it is used in Microsoft Windows CE is simply a subroutine call that will return a particular address of the component or object if it exists, and create or assign an address for that component or object if does not exist. In step 100, the PCM 60 fills the structure of the shared memory area 70. The routine then proceeds to step 110 where the PCM waits to receive a read event from a local process.

Figure 3A:
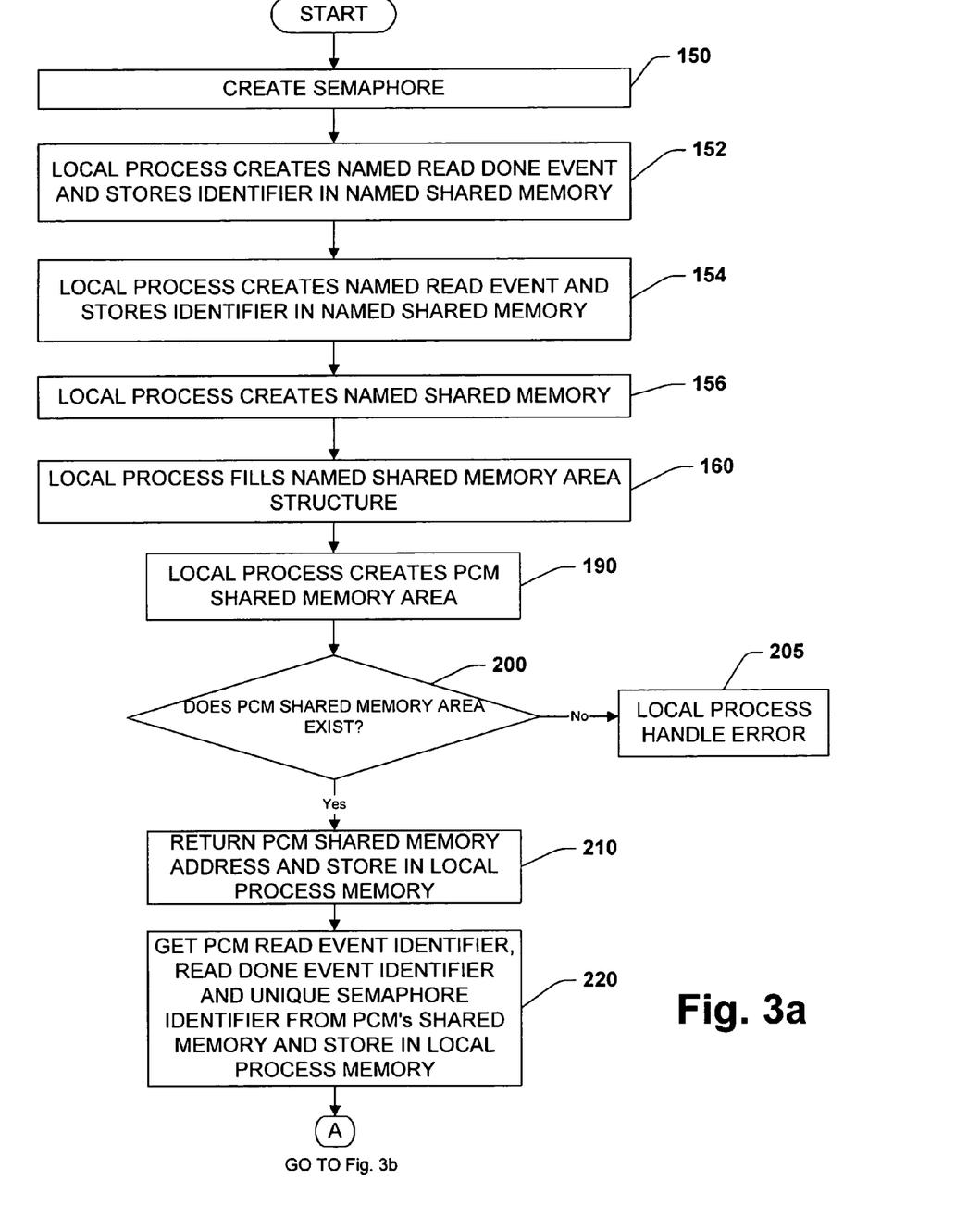
FIGS. 3a-3b illustrate a flow diagram of a local process setup and check in routine in accordance with the present invention.
Figure 3B:
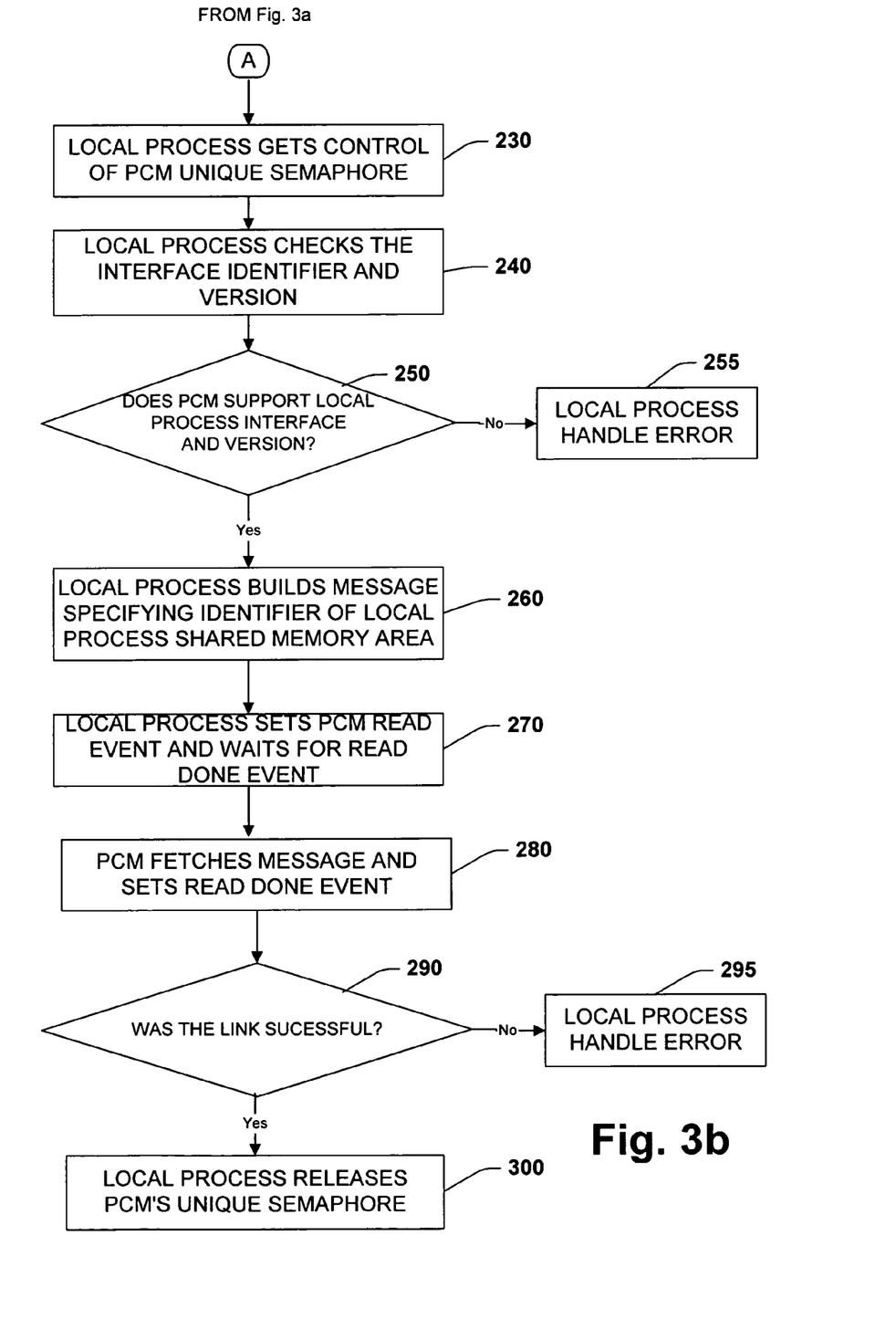

Referring now to FIGS. 3a and 3b, a flow diagram illustrating one particular methodology for performing an initial setup and check in routine for the local process 40 is provided according to the present invention. In step 150, a semaphore is created. In step 152, the local process 40 creates a named read event and stores the identifier in the named shared memory 46. In step 154, the local process creates a named read done event and stores the identifier in the named shared memory 46. In step 156, the local process 40 creates the process A named shared memory 46. Preferably, the shared memory area 46 is also setup in the form of the structure as previously described. In step 160, the local process 40 fills the structure of the shared memory area 46. The routine then proceeds to step 190 where the local process creates a PCM shared memory area and then proceeds to step 200. In step 200, the routine determines if the PCM shared memory area 70 exists. If the PCM memory 70 does not exist, this indicates the PCM 60 is not running and the local process handles the error in step 205, otherwise the routine advances to step 210. In step 210, the routine returns the PCM shared memory address and stores this location in the local process memory 46. The local process 40 then obtains the PCM read event identifier, read done event identifier and the unique semaphore identifier from the PCM's shared memory and stores these addresses in the local shared memory in step 220.

In step 230, the local process 230 obtains control of the PCM unique semaphore, and then checks the interface identifier and version in step 240. The interface identifier identifies the type of protocol being used by the PCM and the specific version of that identifier. The local process 40 determines if the PCM supports the local process's interface and particular version of interface. If no, the local process handles the error in step 255 and aborts. If yes, the local process builds a message in the PCM shared memory area specifying the identifier of the local processes shared memory area, the process identifier of this local process and then sets the data size in step 260. The local process then sets the PCM read event and waits for a read done event from the PCM in step 270. In step 280, the PCM fetches the message and sets the read done event. The PCM's return status in the PCM's shared memory is read to determine if there was a successful link in step 290. If the link was not successful the local process handles the error and aborts in step 295. If the link was successful, the local process releases the PCM's unique semaphore in step 300.

Figure 4A:
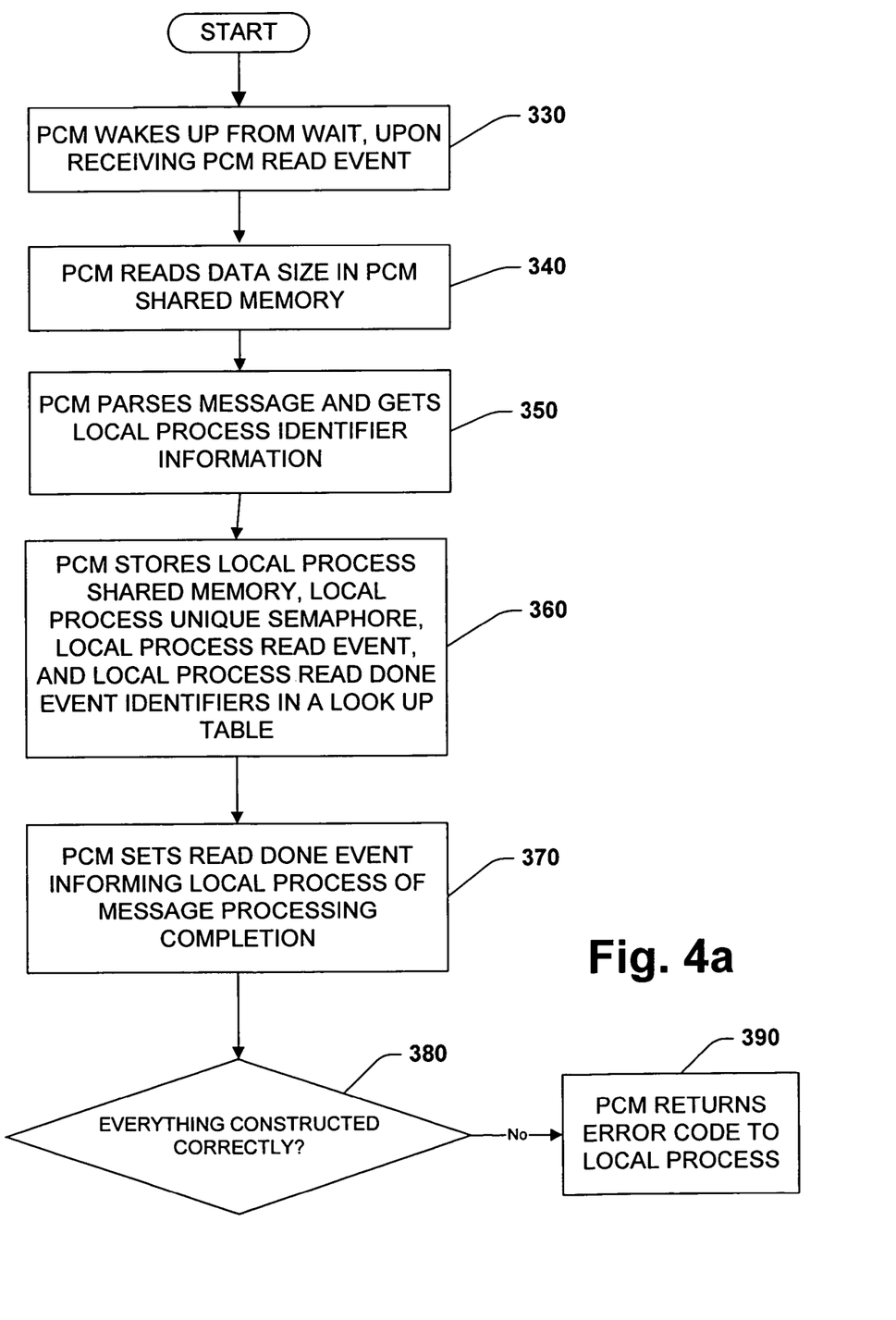
FIG. 4a is a flow diagram of the process communication multiplexer response to a local process setup and check in routine in accordance with the present invention.

FIG. 4a is a flow diagram that illustrates the PCM's response to a local process check in. In step 330, the PCM awakens from its wait upon receiving a PCM read event. In step 340, the PCM 60 reads the data size into the well known shared memory 70. In step 350, the PCM 60 parses the message and obtains the local process identifier information. In step 360, the PCM 60 stores the local process's shared memory area, unique semaphore, read event identifier and read done event identifier into a look up table. In step 370, the PCM sets the read done event informing the local process of message processing completion. In step 380, the PCM 60 sets the return status to successful if proper construction occurred and returns to step 370. If in step 380 everything is not constructed properly the PCM 60 generates an error code specifying what error occurred in step 390.

Figure 4B:
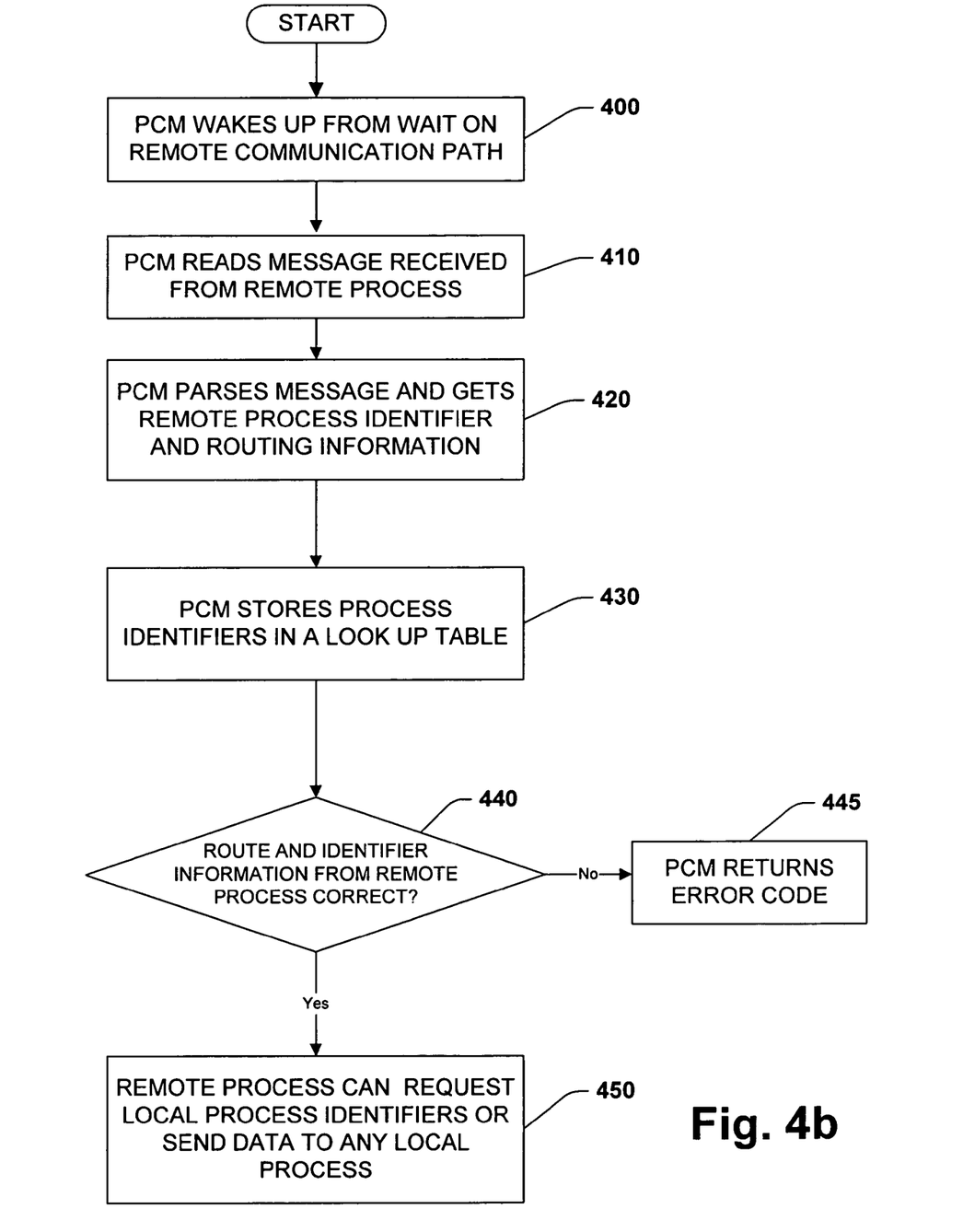
FIG. 4b is a flow diagram of the process communication multiplexer response to a remote process setup and check in routine in accordance with the present invention.

FIG. 4b is a flow diagram illustrating the PCM's response to a remote process check in. In step 400, the PCM awakens from its wait on a remote communication path. In step 410, the PCM 60 reads the message received from the remote process 80. In step 420, the PCM 60 parses the message and obtains the remote process identifier and routing information. In step 430, the PCM 60 stores the remote process identifiers into the look up table. In step 440, the PCM 60 determines if the route and identifier information from the remote process 80 is correct, and generates an error code specifying what went wrong if route and identifier information is not correct in step 475. If a successful communication occurred, the routine proceeds to step 450 where the remote process 80 requests local process identifiers and/or send data to another local process.

Figure 5:
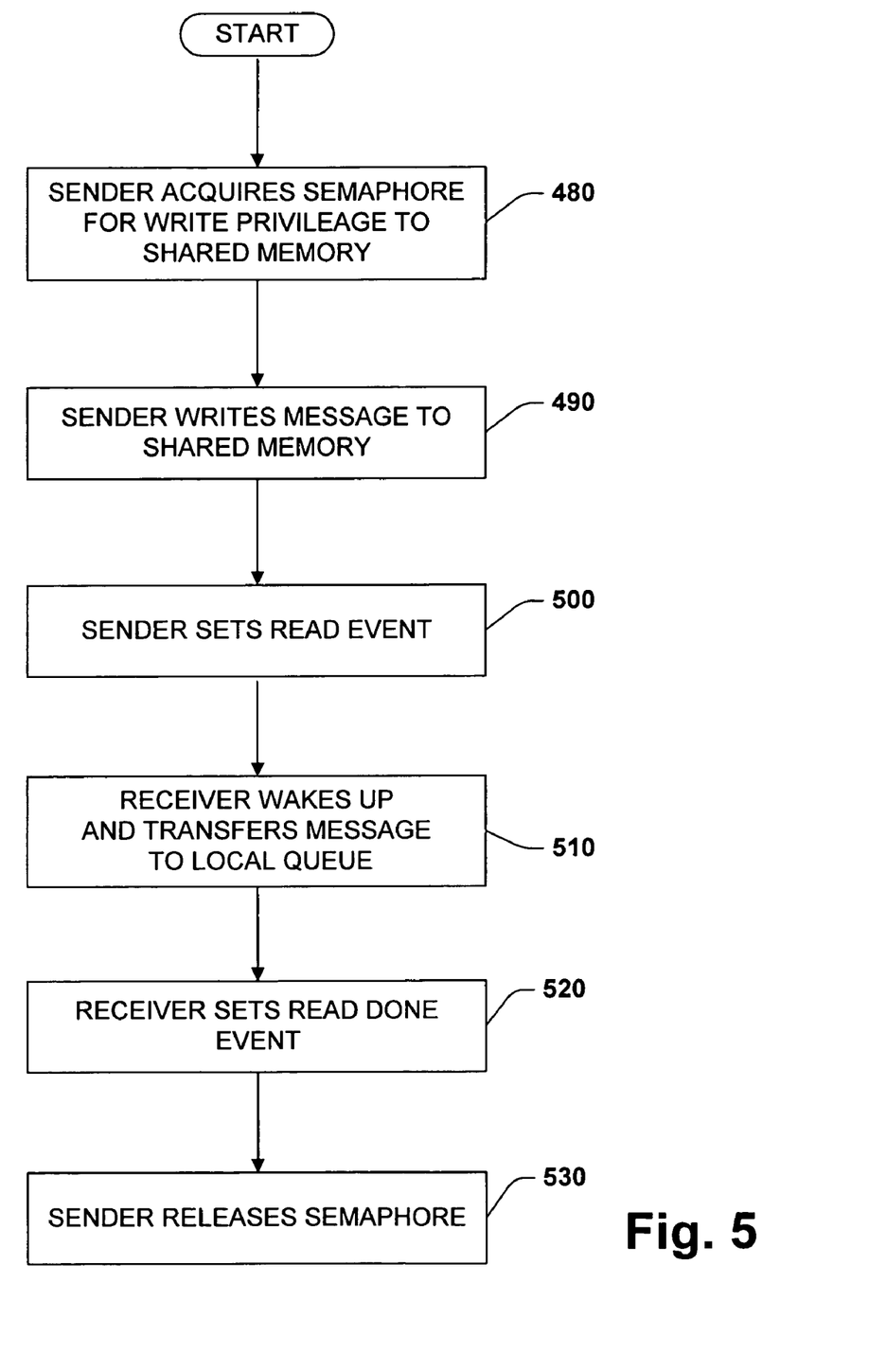
FIG. 5 is a flow diagram illustrating one specific methodology for reading and writing data in accordance with the present invention.

FIG. 5 is a flow diagram illustrating a standard send and receive routine in accordance with the present invention. It is to be appreciated that the sender could be a local or a remote process writing data into the well known shared memory 70 acting as the receiver. Furthermore, the sender could be the PCM 60 writing data into the shared named memory of the local process in which the named shared memory is the receiver. In step 480, the sender acquires the semaphore of the receiver for write privilege to the corresponding shared memory. In step 490, the sender writes a message to the shared memory. The sender then sets the read event of the receiver in step 500. In step 510, the receiver awakens and transfers the message to the local data que. In step 520, the receiver sets the read done event. The sender then releases the semaphore of the receiver in step 530. It should be appreciated that this simple read/write routine can be used to move data from one of the local or remote processes to a well known shared memory area, and from the well known shared memory area to one of the local processes.

Figure 6A:
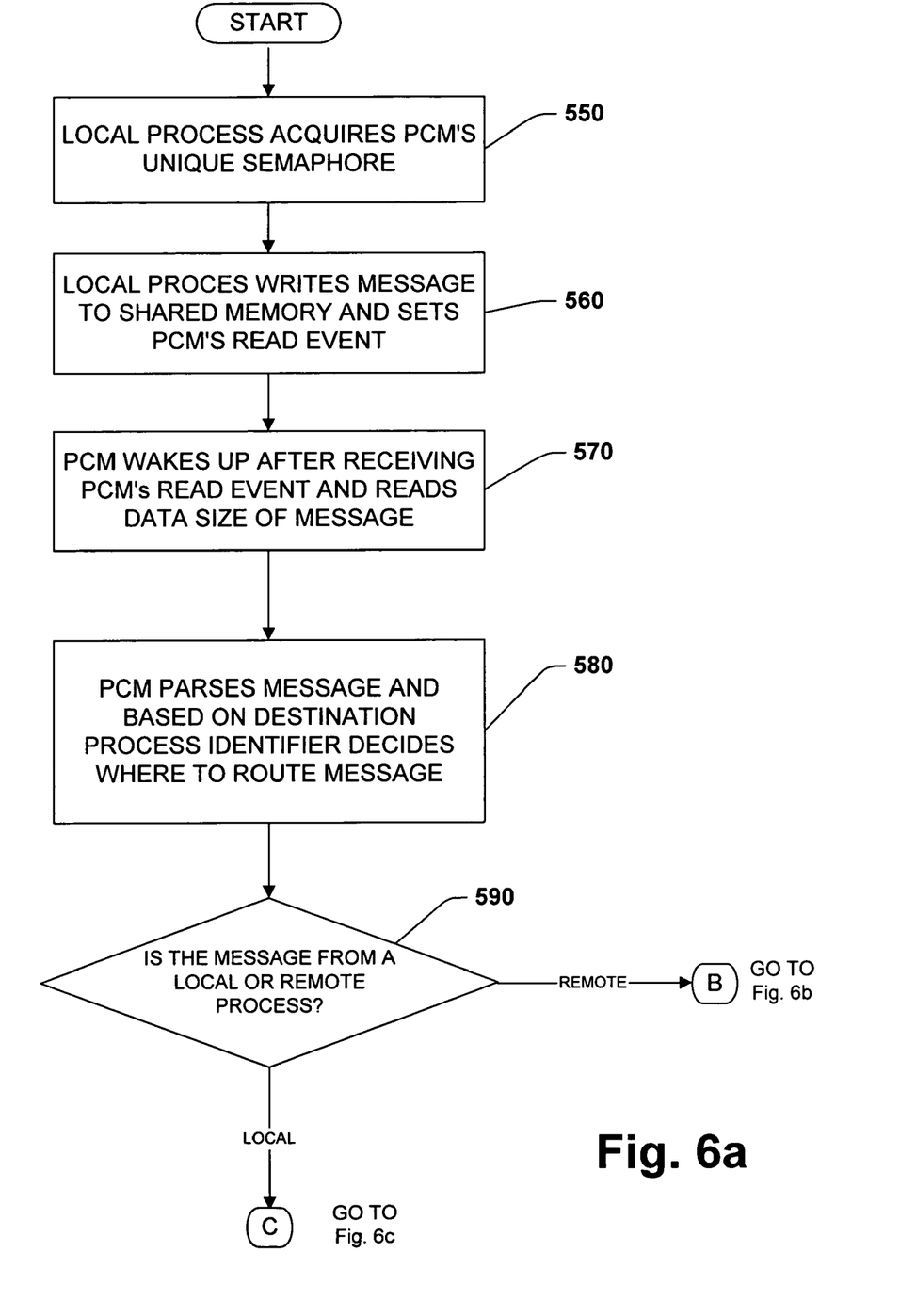
FIGS. 6a-6c illustrate a flow diagram of the process communication multiplexer sequence to a local process send in accordance with the present invention.
Figure 6B:
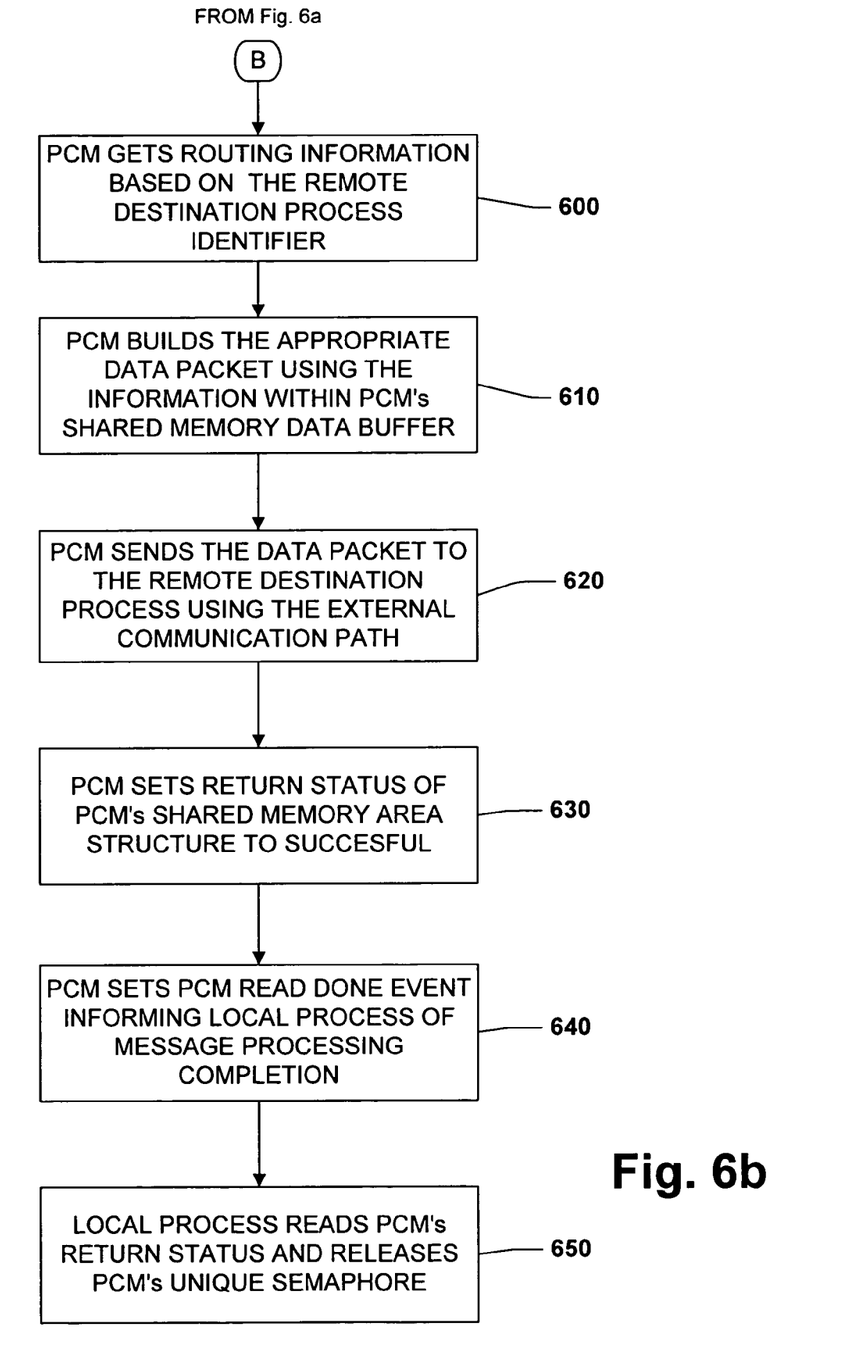
Figure 6C:
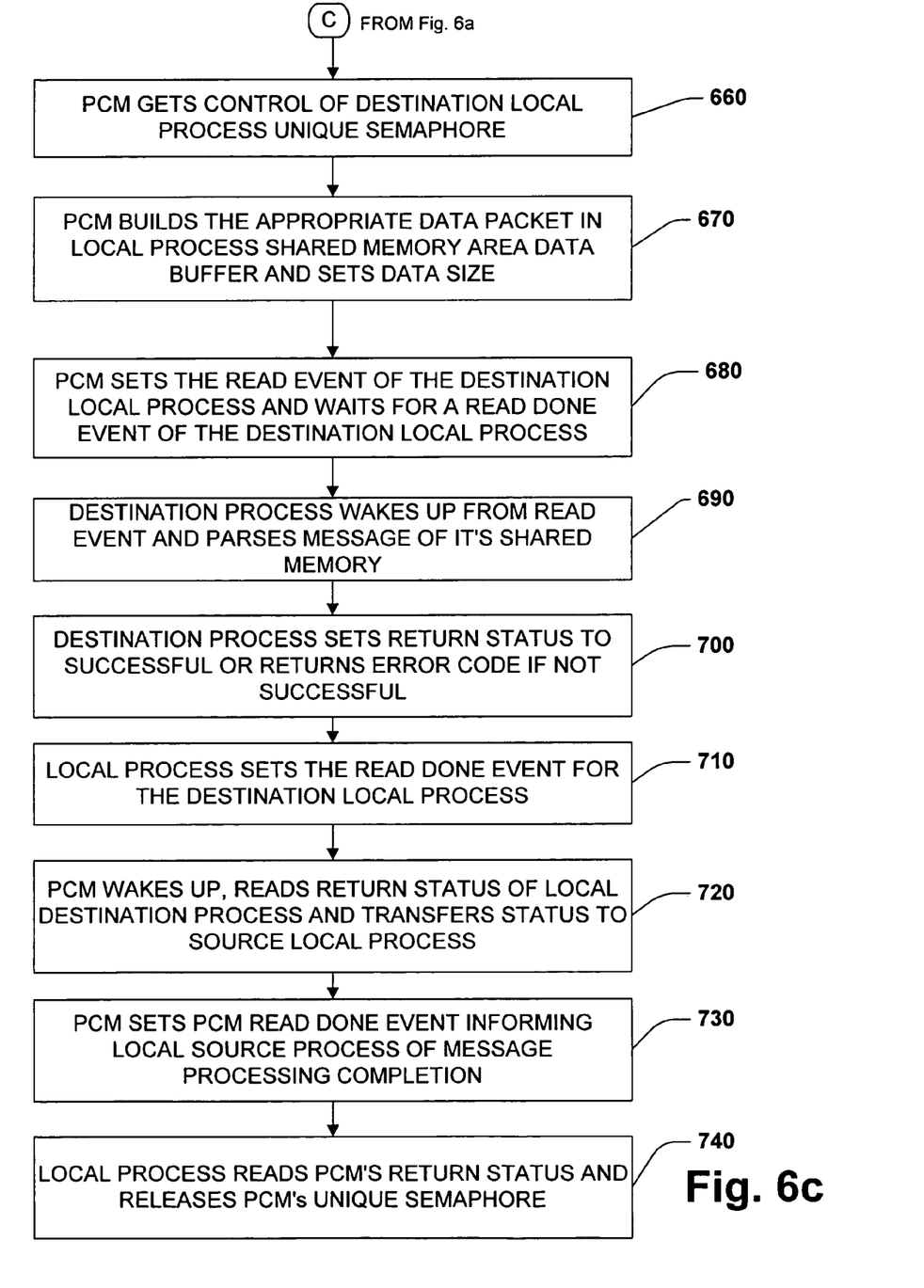

FIGS. 6a-6c is a flow diagram that illustrates the PCM's sequence to the local process 40 sending data to another local process 50 or to the remote process 80. In step 550, the local process acquires the PCM's unique semaphore. In step 560, the local process 40 writes the message to the well known shared memory 70 and sets the PCM's read event. In step 570, the PCM 60 awakens after receiving the PCM's read event and reads the data size of the message. The PCM then parses the message and based on the destination process identifiers, decides where to route the message in step 580 from the look up table created in the local process initial setup and check in routine and then moves to step 590. If the process is remote, the routine follows the steps in FIG. 6b, if the process is local the routine follows the steps of FIG. 6c.

FIG. 6b illustrates the case where the PCM 60 desires to send data received from the local process 40 to the remote process 80. In step 600, the PCM 60 obtains the appropriate routing information based on the remote destination process identifier stored in the look up table from the remote process initial setup and check in routine. The PCM 60 then builds the appropriate data packet using the information within the PCM's well known shared memory 70, and the interface identifier of the remote process stored in the look up table in step 610. In step 620, the PCM 60 sends the data packet to the remote destination process 80 using the external communication path 86. In step 630, the PCM 60 sets the return status of the PCM's well known shared memory area structure to successful. If the remote service is reliable and fast enough, it could send a response back to the PCM based on whether the communication was or was not successful. In step 640, the PCM 60 sets the PCM read done event informing the local process 40 of message processing completion. The local process 40 then reads the PCM's return status and releases the PCM's unique semaphore in step 650.

FIG. 6c illustrates the case where the PCM 60 wants to send the data received from the local process 40 to another local process 50. In step 660, the PCM 60 gets control of the unique semaphore of the destination local process 50. In step 670, the PCM 60 builds the appropriate data packet in the shared memory area 56 of the destination local process 50 and sets the data size. In step 680, the PCM 60 sets the read event of the destination local process 50 and waits for a read done event from the destination local process 50. The destination process 50 awakens from the read event and parses the message in its shared memory 56 in step 690. The destination process 50 sets the return status to successful or returns an error code if the communication was not successful in step 700. The destination local process 50 sets the read done event and returns to waiting for read events in step 710. In step 720, the PCM 60 awakens and reads the return status of the local destination process 50 and transfers the status to the source local process 40. In step 730, the PCM 60 sets the PCM read done event informing the source local process 40 the message processing is complete. The source local process 40 reads the PCM's return status and releases the PCM's unique semaphore in step 740.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that provides a communication medium between a plurality of processes running in a computer system, comprising:
   a processor;
   a memory coupled to the processor;
   a process communication multiplexer component that transfers data between a sending process and a receiving process;
   a shared memory component, created by the process communication multiplexer component to indicate a proper operation during each stage of communication among the sending process and the receiving process, the shared memory component receives a block of data from the sending process; and
   the process communication multiplexer component responds to a communication to said shared memory component from the sending process and routes the block of data to the receiving process,
   wherein each process that checks in provides the process communication multiplexer component with identifying information relating to the process including the memory location of a process named shared memory, a unique semaphore, a read event identifier and a read done event identifier, and
   wherein the process communication multiplexer component stores the identifying information relating to the processes that check in with the process communication multiplexer component in a look up table.

2. The system of claim 1, wherein the sending process and the receiving process are both running locally on the computer system.

3. The system of claim 1, wherein one of the sending and receiving processes is running at a remote location from the computer system.

4. The system of claim 3, wherein the process communication multiplexer component communicates with one of the sending and receiving processes running at the remote location through an external communication path.

5. The system of claim 1, wherein the receiving process includes a shared named memory component for receiving the block of data from the process communication multiplexer component.

6. The system of claim 1, wherein the process communication multiplexer component routes the block of data to the receiving process based on routing information in the block of data received from the sending process.

7. The system of claim 1, wherein the process communication multiplexer component converts the data block received from the receiving process to the protocol required by the sending process.

8. The system of claim 1, wherein each process running in the computer system must check in with the process communication multiplexer component before it can send data to another process.

9. The system of claim 1, wherein the shared memory component contains a structure partitioned into a shared memory size, a unique semaphore identifier, a unique read event identifier, a unique read done event identifier, an interface identifier, an interface version, a data size, a return status and a data buffer.

10. The system of claim 1, wherein the process communication multiplexer component is a hardware device.

11. The system of claim 1, wherein the process communication multiplexer component is a software routine.

12. The system of claim 1, wherein at least one of the sending and receiving processes is a thread.

13. The system of claim 1, wherein an operating system is running on the computer system, the operating system being Microsoft Windows CE.

14. A computer-implemented method for communicating blocks of data from one process running in a computer system to another process running in a computer system, comprising:
   writing a block of data to a shared memory component from a sending process, the shared memory component contains information employed by processes for a data transfer between the sending process and a receiving process via a process communication multiplexer component that creates the shared memory component;
   parsing the block of data to determine the receiving process to route the block of data and an interface protocol required by the receiving process;
   converting the block of data to the proper protocol for the receiving process; and
   routing the block of data to the receiving process in response to a communication to the shared memory component from the sending process,
   wherein the sending process and the receiving process must check in with the process communication multiplexer component before it can communicate data between the processes, and
   wherein each process that checks in provides the process communication multiplexer component with identifier information and determines whether the process communication multiplexer component can support the protocol used by the process and the particular version of the protocol used by the process.

15. The method of claim 14, wherein the process communication multiplexer component performs the steps of parsing the block of data, converting the block of data and routing the block of data.

16. The method of claim 15, wherein the sending and the receiving process must check in with the process communication multiplexer component prior to sending the block of data, so that the process communication multiplexer component can store identifying information about the sending and the receiving process in a table for use in performing the step of routing the block of data to the receiving process.

17. The method of claim 14, wherein the step of routing the block of data includes writing the block of data into a receiving process named shared memory component.

18. The method of claim 14, wherein the sending process and the receiving process are both running locally on a single computer system.

19. The method of claim 14, wherein one of the sending and receiving processes is running on a computer system located remote from a computer system running the other of the sending and receiving processes.

20. The method of claim 14, wherein the sending process and the receiving process can both be a sending and a receiving process.

21. The method of claim 14, wherein the step of routing the block of data to the receiving process is based on routing information in the block of data received from the sending process.

22. The method of claim 14, wherein the sending and receiving processes are running in a computer operating system, the computer operating system being Microsoft Windows CE.

23. The method of claim 14, wherein the process communication multiplexer component stores the identifier information relating to the process in a look up table.

24. The method of claim 14, wherein the step of writing to the shared memory component includes partitioning the block of data into a structure including the following variables: a shared memory size, a unique semaphore identifier, a unique read event identifier, a unique read done event identifier, an interface identifier, an interface version, a data size, a return status and a data buffer.

25. The method of claim 14, wherein at least one of the sending and receiving processes is a thread.

26. A computer program embodied on a computer readable medium for allowing processes running in a computer system environment to communicate blocks of data of varying sizes to other processes, comprising:
   a shared memory object that contains information employed by processes for a data transfer between one of a plurality of sending processes and an associated one of a plurality of receiving processes, the shared memory object receives a block of data from the plurality of sending processes one at a time; and
   a process communication multiplexer object that creates the shared memory object and responds to a communication of the block of data to said shared memory object from one of the plurality of sending processes and routes the block of data to an associated one of the plurality of receiving processes,
   wherein each process that checks in provides the process communication multiplexer object with identifying information and determines whether the process communication multiplexer object can interpret the protocol used by the process and the particular version of the protocol used by the process, and
   wherein the process communication multiplexer object stores the identifying information relating to the processes that check in with the process communication multiplexer object in a look up table.

27. The computer program embodied on a computer readable medium of claim 26, wherein one of the plurality of sending and the plurality of receiving processes is running at a remote location.

28. The computer program embodied on a computer readable medium of claim 26, wherein the one of the plurality of receiving processes includes a shared named memory object for receiving the block of data from the process communication multiplexer object.

29. The computer program embodied on a computer readable medium of claim 26, wherein the process communication multiplexer object routes the block of data to the one of the plurality of receiving processes based on routing information in the block of data received from the one of the plurality of sending processes.

30. The computer program embodied on a computer readable medium of claim 26, wherein the process communication multiplexer object converts the data block received from the one of the plurality of sending processes to the protocol required by the one of a plurality of receiving processes.

31. The computer program embodied on a computer readable medium of claim 26, wherein each process running in the computer system environment must check in with the process communication multiplexer object before it can send data to another process.

32. The computer program embodied on a computer readable medium of claim 26, wherein the shared memory object contains a structure partitioned into a shared memory size, a unique semaphore identifier, a unique read event identifier, a unique read done event identifier, an interface identifier, an interface version, a data size, a return status and a data buffer.

33. A system that provides a communication medium between a plurality of processes running in a computer environment, comprising:
- a processor;
- a memory coupled to the processor;
- a shared memory component configured to receive a block of data from a sending process; and
- a process communication multiplexer component configured to:
  - respond to a communication to said shared memory component from the sending process;
  - convert the block of data to the proper protocol for sending to a receiving process; and
  - route the block of data to a named shared memory component corresponding to the receiving process based on routing information located within the block of data,
- wherein each of the plurality of processes must check in with the process communication multiplexer component prior to any communication between processes to provide the process communication multiplexer component with identifier information for use in transferring the block of data to the receiving process and to determine whether the process communication multiplexer component can support the protocol used by each of the processes and the particular version of the protocol use by each of the processes.

34. The system of claim 33, wherein one of the sending and receiving processes is running at a remote location from the other of the sending and receiving processes.

35. The system of claim 33, wherein the sending process and the receiving process can both be a sending process and a receiving process.

36. The system of claim 33, wherein the shared memory component contains a structure partitioned into a shared memory size, a unique semaphore identifier, a unique read event identifier, a unique read done event identifier, an interface identifier, an interface version, a data size, a return status and a data buffer.

37. The system of claim 33, wherein one of the sending and receiving processes is a thread.

38. A system having a processor and a memory, said system provides a communication medium between a plurality of processes running in a computer environment, said system comprising:
- means for transferring a block of data from a sending process to a receiving process; and
- means for responding to a communication to said means for transferring the block of data from the sending process, the means for responding creates the means for transferring;
- means for converting the block of data to the proper protocol for sending to the receiving process;
- means for routing the converted block of data to the receiving process in response to the communication to the means for transferring; and
- means for checking in the sending and the receiving process prior to sending the block of data, so that identifying information about the sending and the receiving process can be stored in a table for use in routing the block of data to the receiving process by the means for routing the converted block of data.

39. The system of claim 38, wherein the receiving process includes means for receiving the converted block of data from the means for routing the converted block of data.

40. The system of claim 38, further including means for identifying the receiving process, said means for identifying the receiving process being provided within the block of data.

41. The system of claim 38, further including means for receiving the converted block of data from the means for routing the converted block of data.

* * * * *